May 19, 1970     A. L. WHEAR     3,512,363

MOISTURE DISTRIBUTION SYSTEM

Filed July 21, 1967     2 Sheets-Sheet 1

ALFRED L. WHEAR
INVENTOR

BY Paul A. Weilein
ATTORNEY

ALFRED L. WHEAR
INVENTOR

BY Paul A. Weilein
ATTORNEY

United States Patent Office 3,512,363
Patented May 19, 1970

3,512,363
MOISTURE DISTRIBUTION SYSTEM
Alfred L. Whear, Minden, Nev. 89423
Filed July 21, 1967, Ser. No. 655,152
Int. Cl. E02b *13/00*
U.S. Cl. 61—13                                    21 Claims

ABSTRACT OF THE DISCLOSURE

Liquid flowing through a distribution tube in a given axial direction is discharged through relatively small bores in the wall of the tube with the bores directed contrary to the axial direction at an angle of 6° to 14° from the axis of the tube. The liquid may be under high pressure for atomized discharge or without pressure in a tube for subterranean irrigation.

BACKGROUND OF THE INVENTION

In a system supplied with water at substantial pressure for fire prevention in a given region and again in a moisture distribution system operated at substantial pressure for humidifying the ambient atmosphere in a given region, there is need for numerous outlet ports of inexpensive construction that provide atomized discharge and do so with substantially uniform or balanced moistured distribution over the entire region. Outlet fittings or nozzles of various forms are presently available for this purpose. In many instances such nozzles are inefficient atomizers; in other instances the atomizers are of relatively expensive construction to run up the cost of installation; and, in many instances balanced or uniform distribution is achieved only by special and usually expensive provisions to compensate for pressure drop in the system.

On the other hand, in an underground irrigation system for supplying water to a given area there is need for an automatic moisture-responsive control to operate the system periodically in accord with the moisture demand of the soil. There is also need in such an irrigation system for highly economical corrosion-resistant piping and need for non-clogging distribution outlets of efficient but inexpensive construction. There is further need for aeration of the soil by the irrigation system together with a need for suitably retarded flow at each outlet to avoid any significant degree of underground erosion. Finally, there is a special need for uniform water distribution among the numerous outlets to avoid either an oversupply or an undersupply in any part of the ground area.

SUMMARY OF THE INVENTION

A basic discovery underlying the invention is that a relatively long distribution tube having numerous longitudinally spaced outlet bores in its wall will meet the requirements for widely different purposes and widely different modes of operation provided that the outlet bores are inclined upstream at an angle of 6° to 14° relative to the axis of the tube and further provided that the tube wall is sufficiently thick to make the bores long enough for directional effect, i.e., to cause the discharge at each bore to be in a general direction opposite to the direction of flow through the tube.

In a fire prevention sprinkler system or in a system for humidifying the atmosphere water is supplied to the distribution tubes at substantial pressure, say at a pressure of 25 to 150 p.s.i., and the water is atomized or reduced to finely divided form as it issues from each outlet bore. At the other extreme, a similar distribution tube in a subterranean irrigation system is supplied with water at extremely low pressure and at an extremely low rate to seep through each outlet bore at a rate measured in drops per second in a substantially non-clogging manner.

In a subterranean irrigation system incorporating the invention, a distribution tube is called a seep tube and a manifold, which may be substantial level, supplies branch seep tubes that are spaced, say twelve inches apart, on each side of the seep tube with the seep tubes on the two sides of the manifold staggered. Each seep tube is downwardly inclined, say at a drop of approximately one foot for every fifty feet of length, for gravity flow through the seep tube. The supply flow into the manifold is throttled to a relatively low rate so that when the system is in operation the manifold is filled to approximately 60% capacity and the flow into the manifold is just sufficient to maintain gravity flow in the various seep tubes. Thus, the exceedingly low rate of seepage from the spaced seep tube outlets at least approximately matches the percolation rate of the soil and the rate at which the manifold supplies the various seep tubes matches the demands of the seep tubes for gravitational flow therethrough.

In practice, the rate of inflow into a manifold may be determined by a temporary standpipe. For this purpose a tube of clear plastic is connected to the downstream end of the manifold preferably on the underside of the manifold and the tube is turned upwardly for observation of the water level therein. With the manifold in operation the rate of supply flow is throttled or adjusted as required to cause the water level in the upwardly extending tube to be at approximately ground level. For shallow irrigation, for example, to supply water to the turf of a golf course, the seep tubes may be buried at three and one-half inches to four inches below ground level, whereas for deeper irrigation in an orchard the seep tubes may be buried at a depth of sixteen inches to twenty inches. In either case, the pressure is adjusted in the manifold to cause the water level in the upright tube to reach approximately ground level. The higher pressure in the deeper buried manifold compensates for the fact that the resistance to flow into the soil is greater at the greater depth. After a tube has served its temporary purpose as a standpipe, it may be cut short, plugged at the end, and buried in the soil.

An important feature of the invention is that at the contemplated extremely low rates of subterranean discharge, the fines in the soil which are the primary source of food for plant life are not disturbed to any significant extent, i.e., no significant degree of subterranean erosion occurs. The contemplated rates of flow are in the range of one to five gallons per square foot per hour. In a given subterranean irrigation system where the seep tubes are spaced twelve inches apart in parallel relation and the reversely directed outlet bores are spaced six inches apart along the length of each seep tube, the rate of flow may be in the range of one to five drops per second at each outlet bore.

Another important feature of the invention is the aeration of the soil by the irrigation system. When the irrigation system is idle both the supply pipe and the manifolds that branch therefrom may be empty or nearly empty of water to provide an initial volume of air which is to be displaced into the soil when the irrigation system is again placed in operation. In addition, there is a useful degree of aeration of the water that is inherent in the operation of the system.

A further advantage of the invention is that it may be employed to eradicate insect pests from badly infected soil to make possible the raising of crops which otherwise would be prohibited by the infestation. For this purpose an irrigation system embodying the invention is installed in an infested plot of ground and then a gaseous fumigant is introduced into the irrigation system for distribution thereby. The gaseous fumigant selected for this purpose is capable of complete dissipation from the soil within two or three days. After a time period to permit thorough dissipation of the fumigant the crop is planted and the irrigation system is placed into operation to keep the soil supplied with moisture.

A further important feature of the preferred practice of the invention is automatic periodic irrigation with provision for varying the duration of both the periods of irrigation and the intervals between the irrigation periods. For this purpose a suitable moisture-sensing means is buried in the soil to initiate an irrigation operation in response to drop to a predetermined degree of the moisture content of the soil. When the soil is dry enough to cause the moisture-sensing means to start water flow, the newly released moisture migrates to the sensing means from the seep tube that is nearest to the sensing means and, of course, the resulting period of irrigation continues until the supplied moisture reaches the sensing means to cause the sensing means to cut off water flow.

It is apparent that the duration of a periodic irrigation operation varies with the distance of the sensing means from the nearest seep tube and, since the amount of water that is introduced into the soil varies with the duration of the irrigation period, the time that is required for the soil to again dry out also varies with the distance of the sensor from the nearest seep tube. Thus, both the duration of the periodic irrigation operations and the frequency of the periodic irrigation operations may be varied simply by varying the distance between the sensing means and the nearest seep tube.

In both a high pressure atomizing system and a low pressure irrigation system, balanced distribution is desirable in the sense of uniform rates of flow among the numerous reversely directed outlets and substantially simultaneous initiation and cessation of flow at all of the outlets. In practice, such balanced flow requires that when operation of the system is initiated, the main supply pipe downstream from the master valve fill substantially to capacity before water is delivered to any of the manifolds that branch from the supply pipe and it is further required that each manifold fill to capacity before any substantial amount of water is discharged into any of the numerous distribution tubes that branch from the manifold. Finally, each distribution tube should fill to capacity before water is discharged from any of the distribution outlet bores. Thus, in the operation of such a balanced system there is an initial delay for the supply pipe to fill and then a further delay for the manifolds to fill before flow is started in the various distribution tubes. Thereafter, the discharge from the reversely directed outlets of the distribution tubes is substantially uniform along the length of each tube.

In both a high pressure atomizing system and a low pressure irrigation system, the desired initial delay in flow from a main supply pipe into its branching manifolds is accomplished by providing each manifold with a special inlet fitting that projects into the interior of the supply pipe. Each of these inlet fittings has an inlet opening which faces downstream of the main supply pipe.

In such an arrangement initial flow past each inlet fitting occurs at relatively high velocity and causes lowering of pressure, i.e., creates a "suction" effect at the inlet fitting which effect discourages outflow through the inlet fitting to the corresponding manifold. The reverse pressure differential or "suction" effect which discourages outflow through the various inlet fittings is only temporary because when the supply pipe becomes filled substantially to capacity, the flow velocity in the supply pipe drops to terminate the reverse pressure differential or "suction" effect and thereby permit flow to start in all of the manifolds substantially simultaneously.

To control the flow from each manifold into the numerous distribution tubes that branch therefrom, each of the distribution tubes is provided with the same type of inlet fitting, the inlet fitting projecting into the interior of the manifold and having an inlet opening facing downstream of the manifold. Here again, the various inlet fittings resist outflow therethrough until the manifold is filled substantially to capacity whereupon outflow is initiated nearly simultaneously through the various distribution tubes.

As heretofore stated, the distribution tubes that are employed in a high pressure atomizing system may be of the same construction as the seep tubes employed in a low pressure subterranean irrigation system. A surprising fact is that under the two widely different operating conditions the release of fluid is substantially uniform along the length of a distribution tube.

In a high pressure atomizing system the phenomenon of equalized outlet flow along the length of a distribution tube is complex and apparently is the result of conflicting factors. One factor, of course, is that in any conduit having numerous outlets spaced along its length the pressure progressively drops along its length, and if pressure alone were the only factor more water would be released from the outlets at the upstream end of the conduit than at the downstream end. An opposing factor, however, in a high pressure atomizing system is that each of the reversely directed outlet bores of a distribution tube tends to set up a flow-resisting reverse pressure differential or "suction" effect. Since the tendency to create a reverse pressure differential or "suction" effect varies with the velocity of flow through the tube and since the velocity progressively lowers along the length of the tube, both the flow promoting effect and the flow resisting effect drop progressively along the length of the tube and apparently the difference between the two effects is substantially constant along the length of the tube to result in the desired uniform rate of outflow.

Apparently, additional factors also oppose the flow promoting effect of the water pressure at the outlet bores of a distribution tube in a high pressure system. One of these additional factors is that since the outlet bores of the distribution tube are inclined upstream, the direction of outflow is locally reversed and the momentum of the flowing water in the tube makes it difficult for the change in direction to occur. This conflict inherent in the change of direction of flow creates relatively violent turbulence at the inlet end of each of the outlets. Another additional factor is that turbulence is further promoted by the impingement of the stream in the tube against the inclined shoulder that is formed by each of the reversely directed outlet bores. It is these opposing factors that account for the atomized discharge from the reversely directed outlets of a distribution tube in a high pressure system. Thus, the invention teaches a new means for automized discharge of water.

Turning now to a low pressure subterranean irrigation system, the outflow from the same type of distribution tube is also balanced in the sense that the water discharge among the numerous outlets along the length of a seep tube is substantially uniform. In this instance, however, the balanced flow is accounted for by the fact that the water pressure and the rate of flow are so low that there is very little pressure drop along the length of a seep tube.

In a subterranean irrigation system where outflow at such a gradual rate occurs at numerous outlet ports of small cross section, a problem arises in that it is impossible to avoid the entrainment of sand particles and other particles in the system and such particles tend to clog up the small diameter outlet bores. Fortunately, the reversely directed outlet bores discourage clogging because, in the first place, the abrupt reversal in the direction of flow tends to eject entrained particles back into the main stream and, in the second place, the impingement of the flowing water on the previously described inclined shoulders at the inlet ends of the bores prevents any accumulation of particles at the shoulders. Any particle that approaches such a shoulder is diverted into the main stream by the sweeping action. As a result, a subterranean seep tube will function over a long service period without any significant tendency for its outlet bores to become clogged.

DESCRIPTION OF THE PREFERRED EMBODIMENT

FIGS. 1 through 5 show the essential structure of a moisture distribution system which may be either a high pressure atomizing system or a low pressure subterranean irrigation system.

Figure 1:
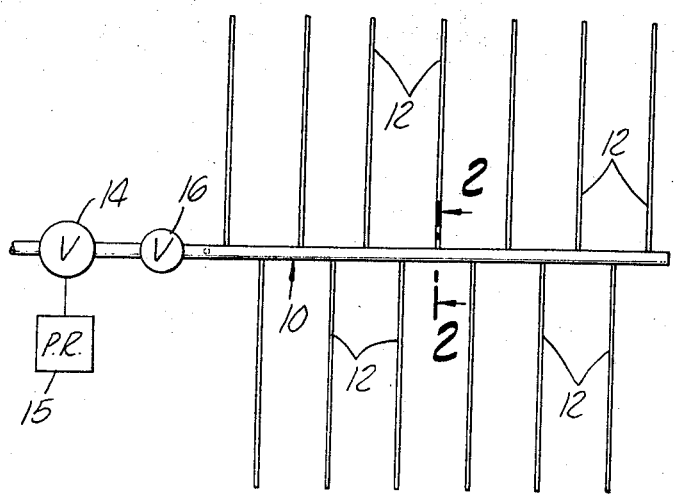
FIG. 1 is a diagrammatic view of a moisture distribution system wherein a plurality of spaced distribution tubes branch from a common manifold, the view representing either a high perssure atomization system or a low pressure subterranean irrigation system.

FIG. 1 shows a single manifold 10 with numerous lateral distribution tubes 12. The manifold 10 may be made of a suitable plastic such as polyvinylchloride and the distribution tubes may be made of a suitable plastic such as a polyethylene. The manifold 10 is supplied with water from a pressurized source by a master valve 14 which may have a suitable control 15. The rate at which the water enters the manifold 10 may be varied by manual adjustment of a choke valve 16 but the choke valve may be omitted if the master valve 14 incorporates an adjustment for this purpose.

The control 15 may take various forms in various systems. For example, the control 15 may be simply a handle for manual operation of the master valve or may be a push button for electrical actuation of the master valve by remote control. For a fire prevention system, the control 15 may be a thermally responsive means such as a thermostat or a control utilizing a low melting material in a well known manner. For a humidifying system the control 15 may incorporate a suitable humidity detector. If the system is a low pressure subterranean irrigation system, the control 15 may incorporate a suitable moisture sensor as will be explained hereafter.

The simplified system shown in FIG. 1 has a single manifold 10 with provision for balanced flow to the various branching distribution tubes 12. In a more elaborate system having a number of manifolds 10 branching from a common supply pipe, provision would be made for balanced flow to the various manifolds as will be explained hereafter. The distribution tubes 12 are spaced apart in accord with the particular purpose of the system and while the distribution tubes are shown as parallel they are not necessarily parallel.

Figure 5:
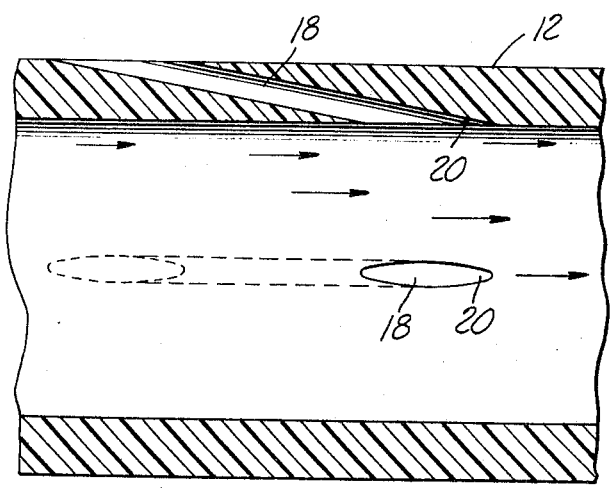
FIG. 5 is a greatly enlarged longitudinal sectional view of a distribution tube showing the reversely directed bores that constitute the outlets of the distribution tube.

Each distribution tube 12 has numerous outlets 18 which, as shown in FIG. 5, are bores in the wall of the tube with each bore inclined upstream towards its outer end at an angle to the axis of the tube within the range of 6° to 14°. An angle of approximately 10° is preferred. It will be noted in FIG. 5 that each inclined outlet bore forms a sloping shoulder 20 inside the distribution tube which shoulder is exposed to the flowing stream of water.

The outlet bores 18 may be at any desired spacing along the length of the distribution tube, for example, a spacing of six inches, such spacing for any given installation being within the skill expected in the art. If desired, groups of the outlet bores may be spaced apart six inches longitudinally of the tube with the bores in each group spaced apart circumferentially of the tube.

The inside diameter of a distribution tube 12 will vary with the length of the tube. For example, a distribution tube fifty feet long may have an inside diameter of $3/16$ inch with a wall thickness of $1/32$ inch and the diameter of the outlet bores may be .021 inch. With a tube wall of the stated thickness and with an outlet bore of the specified diameter and with the outlet bore inclined approximately 10°, the length of the outlet bore will be several times its thickness so that the outlet bore will have a definite directional effect. The directional effect is important because it is contemplated that liquid may escape through an outlet bore only by reversing its direction with respect to the direction of main flow through the tube.

Figure 2:
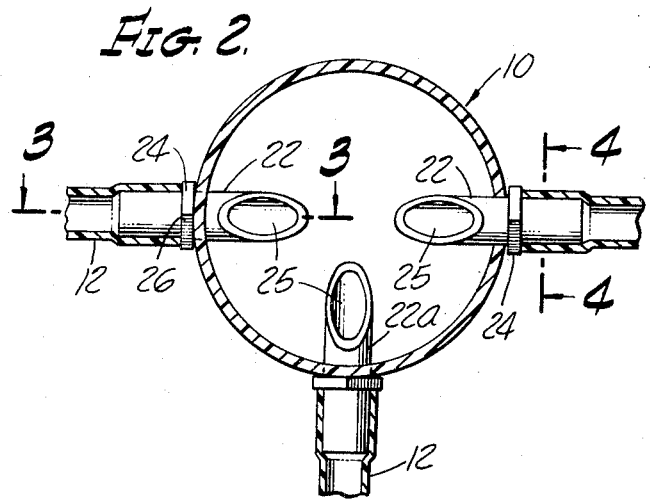
FIG. 2 is an enlarged cross section of the manifold taken along the line 2—2 of FIG. 1 showing various inlet fittings projecting from the distribution tubes into the interior of the manifold.
Figure 3:
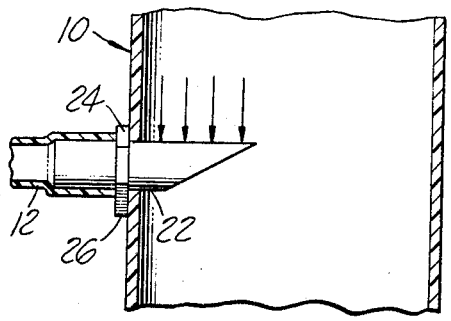
FIG. 3 is a fragmentary longitudinal section along the line 3—3 of FIG. 2 showing one of the inlet fittings.

To achieve balanced initiation of flow among the various distribution tubes 12, each distribution tube is provided with an inlet fitting 22 which may be made of a suitable plastic. As shown in FIGS. 2 and 3, each inlet fitting 22 is of tubular configuration and may be cemented into a corresponding radial bore in the tube wall. In the construction shown, each inlet fitting 22 is provided with a radial flange 24 which abuts the outer surface of the tube and serves as a stop to determine the extent to which the fitting protrudes into the interior of the manifold 10. Each of the tubular inlet fittings 22 is cut off at an acute angle as indicated in FIG. 3 to provide an elliptical inlet opening 25 as may be seen in FIG. 2 and the inlet fitting is so oriented that the elliptical inlet opening faces downstream.

Figure 4:
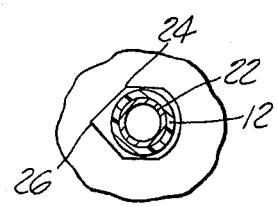
FIG. 4 is a section along the line 4—4 of FIG. 2 showing how each of the inlet fittings may be provided with an exterior flange that indicates the orientation of the fitting and also indicates the direction of flow through the manifold.

A feature of the invention is that the radial flange 24 of an inlet fitting 22 not only serves as a stop when the inlet fitting is being installed in a manifold 10, but also serves as means to indicate the orientation of the inlet fitting. For this purpose the radial flange 24 is formed with a point 26 as shown in FIG. 4, the point indicating the direction in which the inlet opening faces. The pointed flange not only provides guidance for orientation of an inlet fitting in a manifold 10, but also provides guidance in the orientation of a manifold in a system.

As heretofore noted, it is preferred that a manifold 10 be at least nearly empty when the system is not in operation. With a manifold nearly empty, initial flow through the manifold is relatively rapid but the pressure in the manifold does not rise until the manifold is filled to its normal capacity. It is this preliminary delay period that provides balanced starting flow in the sense that outflow starts through all of the distribution tubes substantially simultaneously.

In a high pressure atomization system a manifold 10 fills rapidly and fills completely with water. On the other hand, in a low pressure subterranean irrigation system the inflow to the manifold is throttled and the manifold fills with water to less than its full capacity, say to 60% of its full capacity. Since the water level in a low pressure system does not reach the top of the manifold, the various seep tube inlet fittings in the manifold are at relatively low levels, no seep tube inlet fitting being mounted on the top side of the manifold.

The preliminary delay required for balanced flow occurs in a low pressure manifold in substantially the same manner as in a high pressure manifold, but the preliminary delay is longer. During this initial period in which the water flows along the manifold at substantial velocity but without appreciable pressure, the force of the water past the inlet fittings 22 creates a partial vacuum on the downstream side of each inlet fitting and consequently the tendency is for air to be drawn into the manifold through the inlet fittings of the seep tubes instead of water being forced into the seep tubes. When the manifold fills to its capacity, however, pressure rises in the manifold and overcomes the vacuum effects at the various inlet fittings to cause flow to be initiated into the various seep tubes.

When water flow into the seep tube is initiated, the same kind of delay occurs because a mild resistance to outflow exists at each of the discharge bores of the seep tube because of the reverse direction of the outlet bores. As soon as a seep tube fills completely with water, however, the resultant mild pressure rise causes substantial simultaneous initiation of outflow at each of the outlet bores.

Figure 6:
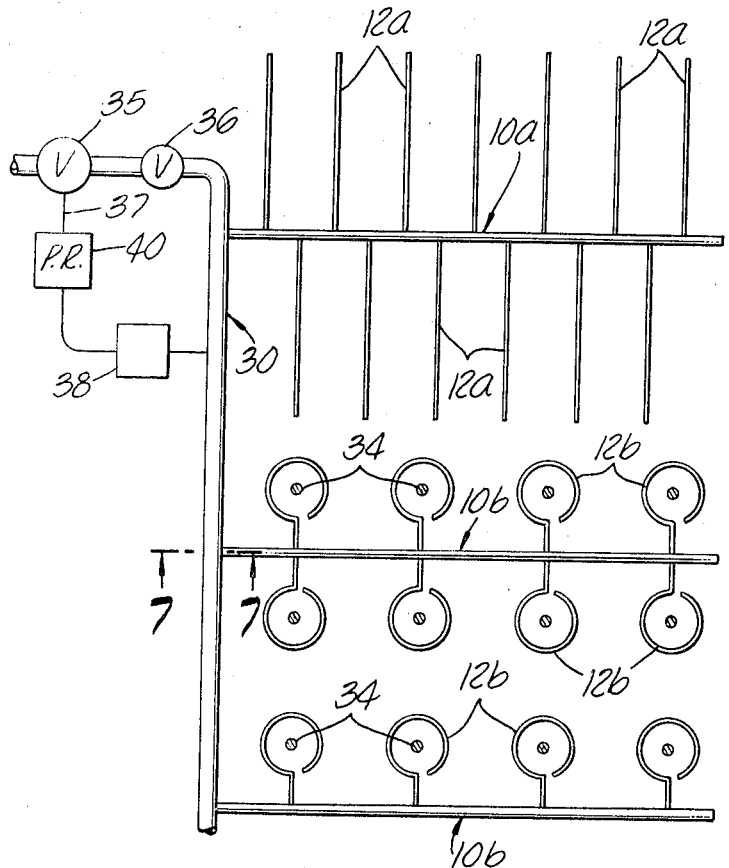
FIG. 6 is a diagrammatic plan view of a subterranean irrigation system, part of the system being employed for underground irrigation of a lawn or turf and another part of the system being employed for subterranean irrigation of rows of trees.

FIG. 6 shows diagrammatically a low pressure subterranean irrigation system which includes a supply pipe 30 with a number of manifolds 10 branching therefrom. One manifold 10a irrigates a lawn or turf area and for this purpose has parallel lateral seep tubes 12a spaced twelve inches apart and buried in the soil at a depth of three and one-half inches to four inches at the inlet ends of the seep tubes. Each of the seep tubes 12a may be horizontal but preferably slopes downwardly towards its outer end as heretofore stated. Two manifolds 10b shown in FIG. 6 are employed for subterranean irrigation of rows of trees 34 and for this purpose the corresponding seep tubes 12b are looped around each tree at a depth of sixteen inches to twenty inches below ground level.

FIG. 6 shows diagrammatically a master valve 35 with a choke valve 36 downstream therefrom, but the choke valve may be omitted if the master valve incorporates flow adustment means. In a well known manner the master valve 35 includes a pilot tube 37 controlled by a pilot valve, which pilot valve is incorporated in a moisture sensor 38 that is buried in the soil. In this instance it is assumed that the water source is at a pressure above 40 p.s.i. and, therefore, it is desirable to place a pressure reducer 40 in the pilot tube 37 between the master valve and the moisture sensor to reduce the water pressure in the pilot tube at the moisture sensor. Preferably, the pilot tube 37 extends beyond the moisture sensor 38, as shown, and empties into the supply pipe 30.

Figure 9:
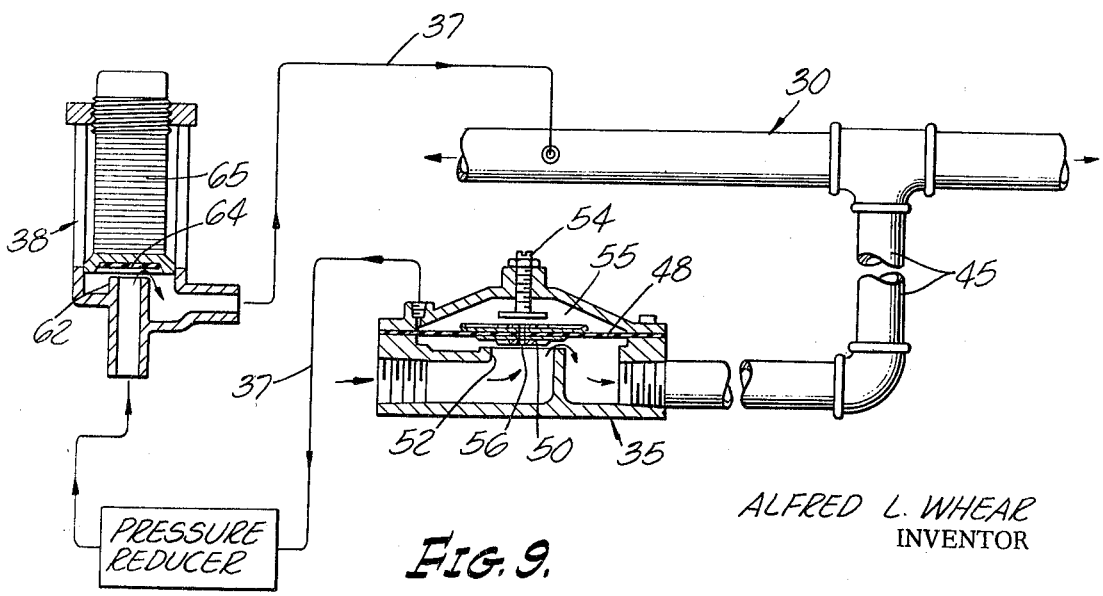
FIG. 9 is a schematic view showing how a buried moisture-sensing means may control the pilot valve of a master control valve for periodic operation of an irrigation system.

FIG. 9 shows how the choke valve 36 may be omitted by incorporating its function in the master control valve. In FIG. 9 the master control valve 35 which is connected to a pressurized water source is in turn connected by a pipe 45 to the previously mentioned supply pipe 30.

The master control valve 35 has a diaphragm 48 which carries a volve member 50 for cooperation with a valve seat 52. A manual adjustment screw 54 limits the extent to which the valve member may retract from the valve seat and thus serves the purpose of a manually adjustable throttle valve.

The diaphragm 48 forms a control chamber 55 and the valve member 50 has a bleed aperture 56 for communication with the control chamber. The previously mentioned pilot tube 37 extends from the control chamber 55 to the pilot valve that is incorporated in the moisture sensor 38. The pilot valve in the moisture sensor has a valve seat 62 and a cooperatnig valve member 64 that is controlled by a block 65 of fibrous material.

When the block 65 becomes relatively dry it contracts longitudinally to retract the valve member 64 from the valve seat 62 to permit flow through the pilot tube 37. On the other hand, when the block 65 becomes soaked with moisture it expands to seat the pilot valve member. Normally, both the master control valve 35 and the pilot valve are closed with the control chamber 55 at line pressure. Whenever the pilot valve opens, the consequent drop in pressure in the control chamber 55 causes the diaphragm to retract the valve member 50 from the valve seat 52.

As heretofore pointed out, the frequency of the operation of the subterranean irrigation system shown in FIG. 6 and the duration of the periods of operation depend upon the distance that the moisture sensor 38 is placed from the nearest seep tube. The pilot tube 37 empties into the supply pipe 46 because if it were to empty into the soil it would supply moisture in the region of the moisture sensor and thus defeat the purpose of the moisture sensor.

Figure 7:
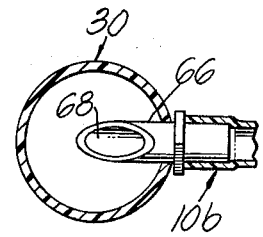
FIG. 7 is an enlarged section along the line 7—7 of FIG. 6 showing how an inlet fitting of each manifold projects into the interior of the main supply pipe.

The manner has already been described in which inlet fittings 22 are employed at the inflow ends of seep tubes for balanced flow among the seep tubes that branch from a manifold. In the same manner, similar inlet fittings project from the manifolds 10 in FIG. 6 into the supply pipe 30 for balanced flow among the various monifolds. FIG. 7 shows how the end portion 66 of a manifold 10 may project into the supply pipe 30. In a manner heretofore described, the end portion 66 of the manifold is cut off at an angle to provide an elliptical inlet port 68 that faces downstream in the supply pipe.

A certain problem arises in that it is desirable to provide some means for draining a manifold at the end of an irrigation period. One way to obtain such drainage is to mount one of the seep tubes on the underside of the manifold to provide a drainage passage. Thus, FIG. 2 shows an inlet fitting 22a that is low enough in the manifold 10 to serve as drainage means.

Figure 8:
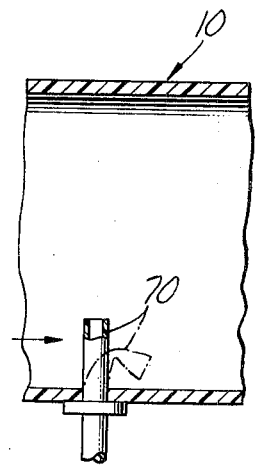
FIG. 8 is an enlarged fragmentary longitudinal section of a manifold showing how a flexible plastic tube may be employed for drainage of the manifold between periods of operation of the system.

FIG. 8 shows an alternate drainage means that may be employed either in a manifold or in a supply pipe. In FIG. 8 the manifold or supply pipe has a drainage port which is occupied by a short flexible drainage tube 70. In the absence of water flow against the side of the drainage tube 70, the drainage tube assumes an upright position as indicated by solid lines and water freely gravitates through the drainage tube. When the system is in operation, however, the dynamic pressure of the flowing water bends the tube as shown in dotted lines to such an extent as to kink the tube and thereby cut off drainage communication through the tube.

My description in specific detail of the presently preferred practices of the invention will suggest various substitutions, changes and other departures from my disclosure within the spirit and scope of the appended claims.

1. In a system for distributing a liquid to spaced points in a given region the combination of:
   a conduit extending into the given region;
   means to supply the liquid to the conduit for flow therethrough in a given longitudinal direction,
   said conduit having a plurality of spaced peripheral discharge passages,
   each of said discharge passages being of a length substantially greater than its cross dimension for directional effect on the flow therethrough,
   each of said discharge passages being directed contrary to said given direction at an angle to the axis of the conduit in the range of 6° to 14°.

2. A combination as set forth in claim 1 in which said angle is approximately 10°.

3. A combination as set forth in claim 1 in which said discharge passages are bores in the wall of the conduit.

4. A combination as set forth in claim 1 in which said given region is in an atmosphere and said supply means supplies the liquid to the conduit at a substantial pressure to cause atomization into the atmosphere of the liquid from the discharge passages because of the contrary direction of the discharge passages.

5. A combination as set forth in claim 1:
in which said system is an irrigation system;
in which said given region is below ground level; and
in which said supply means supplies water to the conduit at relatively low pressure to cause the rate of discharge of the water from the discharge passages to be low enough to avoid significant disturbance of the soil structure.

6. A combination as set forth in claim 5 in which said conduit is inclined downwardly in said given direction; and
in which said supply means supplies water to the upper end of the conduit at low pressure and at a low rate for low velocity free gravity flow through the conduit as distinguished from high velocity flow created by a substantial pressure differential.

7. A combination as set forth in claim 1 which includes a manifold connected to said supply means;
in which said conduit is one of a plurality of conduits branching from said manifold at spaced points along the length of the manifolds;
in which each of said conduits has an inlet fitting projecting into the interior of the manifold; and
in which said inlet fittings have inlet openings facing downstream with respect to said given longitudinal direction whereby reduction of pressure at the inlet fittings caused by flow of the liquid past the inlet openings substantially retards flow from the manifold into the respective conduits until initial flow into the manifold accumulates sufficient liquid in the manifold to cause a substantial drop in the velocity of flow through the manifold.

8. A combination as set forth in claim 7 which includes means on the exterior of the manifold to indicate the directions in which said openings of the fittings face for guidance in the installation of the fittings in the manifold as well as for guidance in the installation of the manifold with respect to the direction of flow through the manifold.

9. A combination as set forth in claim 1 in which:
said system is a subterranean irrigation system;
said system includes a subterranean manifold connected to said supply means;
said conduit is one of a plurality of conduits branching from said manifold at spaced points along the length of the manifold; and
the pressure in the manifold is substantially equal to a head of water extending from the manifold to approximately ground level.

10. A combination as set forth in claim 9 in which the conduit is substantially horizontal.

11. In an irrigation system, the combination of:
a subterranean conduit for water flow therethrough in a given longitudinal direction,
said conduit having a plurality of spaced discharge passages,
each of said discharge passage being directed contrary to said given direction at an a cute angle to the axis of the conduit whereby water flowing through the conduit sweeps across the inlet of each discharge passage and impinges on an inclined shoulder formed by the inlet on the downstream side thereof to tend to carry entrained particles past the inlet and to tend to sweep away any particles that reach the inclined shoulder, thereby to minimize clogging of the discharge passages by entrained particles; and
means to supply water to said conduit at a rate low enough to avoid any significant erosion of the soil in the regions of the discharge passages.

12. A combination as set forth in claim 11 in which the means to supply water to the conduit supplies the water at a rate equivalent to one to five gallons per hour per square foot of the irrigated area.

13. A combination as set forth in claim 11 in which said discharge passages are bores in the wall of the conduit, each bore being of a length substantially greater than its diameter.

14. A combination as set forth in claim 11 in which said conduit is inclined downwardly from its inlet end for a drop not substantially more than one foot for each fifty feet of length for free gravitational flow therethrough at a given rate permitted by said discharge passages; and
in which said supply means supplies water to said conduit at substantially said given rate.

15. A combination as set forth in caim 11 which includes moisture responsive means buried inthe soil near said conduit to control flow of water into the conduit and to initiate such flow in response to a predetermined drop in moisture at the responsive means, thereby to cause periodic irrigation of the soil,
the frequency of the periods of irrigation depending upon the durations of the periods of irrigation and the duration of the periods of irrigation depending, in turn, on th elength of time required for water to migrate through the soil from the conduit to the responsive means,
whereby both the frequency and the duration of the irrigation periods may be varied by varying the distance of the moisture responsive means from the conduit.

16. In an irrigation system, the combination of:
at least one manifold;
a plurality of subterranean distribution conduits branching from the manifold at spaced points thereof, each of said conduits having spaced discharge ports, said conduits being downwardly inclined towards their outer ends for gravity flow therethrough;
a plurality of inlet fitting at the inlet ends of said conduits projecting into the interior of the manifold; and
means to supply water periodically to said manifold at a rate for free running gravity flow through the plurality of conduits at not substantially more than one p.s.i.,
each of said inlet fittings having an inlet opening in the manifold facing downstream thereof whereby reduction of pressure at each of the inlet openings caused by flow of the water past the inlet opening substantially retards flow from the manifold through the respective conduits until initial flow into the manifold accumulates sufficient water in the manifold to cause a substantial drop in the velocity of flow through the manifold.

17. A combination as set forth in claim 16 in which said means to supply water periodically to the manifold includes a control means including a pilot valve;
which includes moisture-responsive means buried in the the soil to operate said pilot valve;
and which includes a tube to deliver the water from the pilot valve to the interior of the manifold to prevent the water that flows through the pilot valve from affecting the moisture-responsive means.

18. A combination as set forth in claim 16 in which each of said inlet fittings is of the configuration of a tube with an inlet end of the tube cut off at an acute angle relative to the axis of the tube to form an elliptical inlet opening facing downstream of the manifold.

19. A combination as set forth in claim 16 in which at least one of the inlet fittings in the manifold is in the lower half of the manifold to drain liquid from the manifold between the periods in which water is supplied to the manifold.

20. A combination as set forth in claim 16 in which said manifold has a drainage port and in which a drainage tube projects into the manifold from the drainage port,
said drainage tube being resiliently flexible to flex in response to flow of water through the manifold and thereby seal off the drainage port as long as water is flowing through the manifold.

21. A combination as set forth in claim 16 in which:
a plurality of manifolds branch from a supply pipe with subterranean distribution conduits branching from each manifold;
each of said manifolds has an inlet fitting projecting into the interior of the supply pipe; and
each of said inlet fittings has an inlet opening in the supply pipe facing downstream therein,
whereby reduction of pressure at each of the inlet fittings in the supply pipe caused by flow of water past the fitting substantially retards flows from the supply pipe into the respective manifolds until initial flow into the supply pipe accumulates sufficient water in the supply pipe to cause a substantial drop in the velocity of flow in the supply pipe.

References Cited

UNITED STATES PATENTS

| | | | |
|---|---|---|---|
| 1,204,309 | 11/1916 | Peterson | 239—550 |
| 3,204,872 | 9/1965 | Whear | 61—13 X |
| 3,302,323 | 2/1967 | Popa | 239—450 X |
| 3,361,363 | 1/1968 | Babington | 61—13 X |

FOREIGN PATENTS 844,498  4/1939  France.

JACOB SHAPIRO, Primary Examiner

U.S. Cl. X.R.

47—9; 137—608; 239—267, 550; 169—16; 251—24